VARIABLE LENGTH PHOTODIODE USING AN INVERSION PLATE

Filed Feb. 19, 1965

INVENTOR.
LOUIS J. KABELL
BY Roger L. Brown
Stuart Lubitz
ATTORNEY

United States Patent Office 3,391,282
Patented July 2, 1968

3,391,282

VARIABLE LENGTH PHOTODIODE USING AN INVERSION PLATE

Louis J. Kabell, Palo Alto, Calif., assignor to Fairchild Camera and Instrument Corporation, Syosset, N.Y., a corporation of Delaware Filed Feb. 19, 1965, Ser. No. 433,959
7 Claims. (Cl. 250—211)

ABSTRACT OF THE DISCLOSURE

A semiconductor scanning device made up of semiconductor material of one conductivity type having a contained region of the opposite conductivity type. The device has an insulating layer over the surface of the wafer and an inversion plate formed atop the insulating layer. Both the insulating layer and the inversion plate are transparent to light. The application of a voltage gradient across the inversion plate in order to progressively apply an inversion potential to points beneath the inversion plate creates within the wafer a region having a conductivity opposite to the wafer. Thus a PN junction having a controllable length is formed. The device is useful for sequentially sensing the special distribution of light intensity along a single line of defined width.

This invention relates to a means (1) for sequentially sensing a spatial distribution of light intensity along a single line of defined width and (2) for converting the sensed distribution of light intensity into a time varying electrical signal proportional to the incident light intensity. In particular the invention relates to a variable length conductive layer in the specific form of a variable length region that comprises part of a PN junction which functions as a scanning diode.

It has been known in the prior art that light sensing and conversion to an electrical signal can be achieved by electronic cathode ray camera tubes, such as the image orthicon or vidicon tube. This function has also been performed by solid state photodiodes or photoconductors arranged in a linear array and sequentially connected to a detecting circuit by an array of switches.

Cathode ray camera tubes require a complex array of components and circuits in order to focus the electron beam which addresses the photosensitive surface of the tube and to cause the beam to sweep across the photosensitive surface in a proper fashion. Included in these components and circuits are such devices as focusing coils, deflection yokes, sweep drive amplifiers, linear sweep generators, shading correction circuits and dynamic focusing circuits.

Solid state arrays, such as arrays of photodiodes or photoconductors, require a switch for each element in the array and means for actuating each switch in a proper time sequence. As the number of elements in the array become large, the complexity of the switching apparatus becomes unwieldy. This is so even when microminiature circuitry, such as integrated semiconductor circuits, is used. For example, a two hundred element linear array could be constructed in the length of approximately one-half inch, but it would require sequential switching which would occupy six of seven 4" x 5" printed circuit cards.

A scanning photodiode made in accordance with this concept requires only two terminal connections to provide the scanning function, and two additional connections to supply a bias to the device and to conduct the video signal from the device. This is a decided simplification over prior art devices. In addition, the device is well suited to be manufactured by well known semiconductor processes which produce high reliability devices and enable mass production at relatively high yields.

Briefly, the structure of the invention comprises a first region of monocrystalline semiconductor material having a first conductivity type, and a means for forming a second monocrystalline region of opposite conductivity type having a variable and controlled length. The first and second regions form a variable length PN junction whereby a scanning photodiode may readily be formed.

This general structure will be understood in detail by referring to the detailed description which follows and the drawings wherein.

Figure 1:
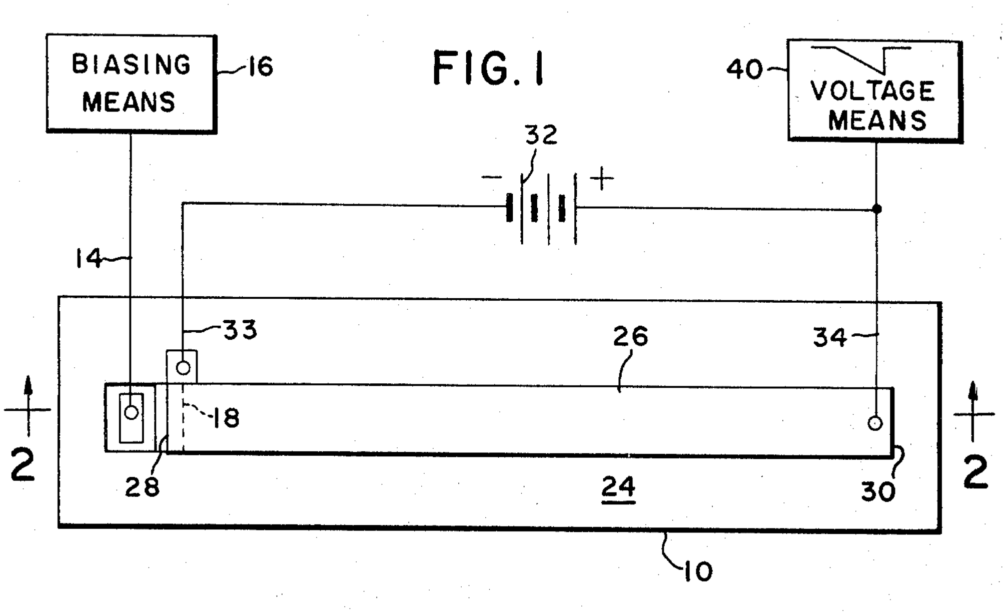
FIG. 1 is a simplified plan view of the device.
Figure 2:
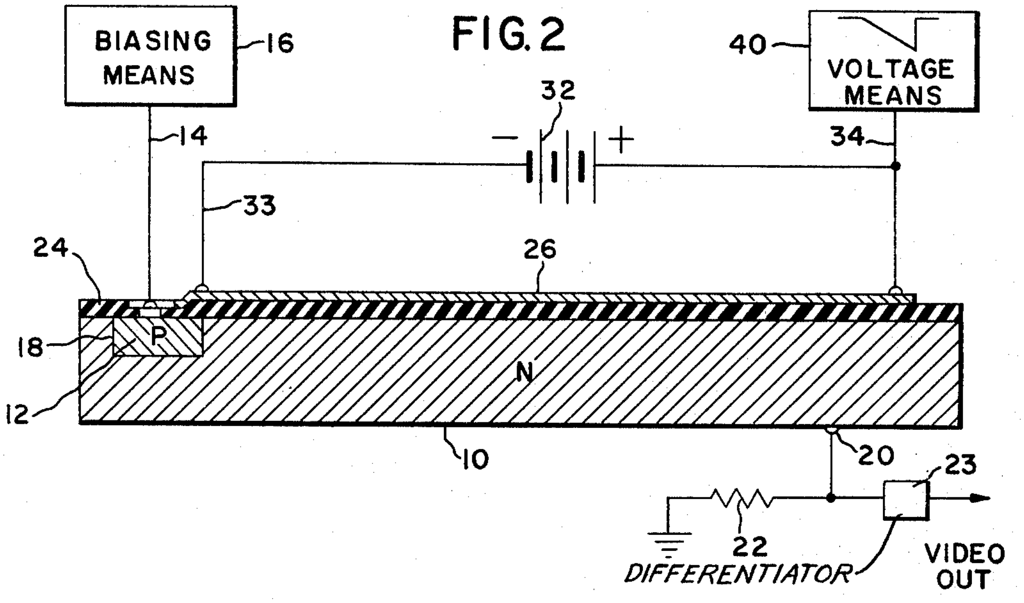
FIG. 2 is a sectional view taken along the line 2—2 of FIG. 1.

Referring to FIGS. 1 and 2, the device includes a first semiconductor region which takes the form of a monocrystalline silicon wafer 10 of a first conductivity type, which typically may be an N-type, formed by inclusion of an impurity such as arsenic, antimony or phosphorous. A second semiconductor region 12 of conductivity type opposite from wafer 10 (P-type in this example) is formed within the wafer. Region 12 may be formed by diffusion of an impurity such as boron, aluminum or indium into a selected region of wafer 10. A contact to wafer 10 is applied conventionally to region 12, and has a lead 14 connected thereto. Lead 14 is connected to a biasing means 16 for applying a reverse bias to PN junction 18 formed between wafer 10 and region 12. The region 12 may take on many different configurations, such as an elongated region or an annular elongated region. The biasing means 16 is usually a DC voltage source which, in the case of a P-type region 12, has its negative terminal connected to lead 14. The biasing circuit is completed by contact 20 (FIG. 2) connected to ground via resistor 22. A differentiator means 23 is also connected to contact 22 and functions to supply an output signal which is proportional to the rate of change of the input voltage.

Overlying a substantial portion of the surface of wafer 10 is a layer of insulating material 24 which, in the case of a silicon wafer 10, may be a layer of silicon dioxide. The insulating layer 24 is constructed to transmit light therethrough. This is readily accomplished when employing silicon dioxide as it is a transparent material. The layer 24 not only functions as an insulating layer but also protects the junction 18 from environmental contaminants.

Overlying a portion of layer 24 is a long narrow rectangular inversion plate 26 made from a resistor material and formed to permit light to pass therethrough. In order to permit light to pass through inversion plate 26, it may be constructed from tin oxide which is a transparent material or from Nichrome which is a semi-transparent material or from an opaque material with a slit. One end 28 of plate 26 is in the proximity of region 12 and its other end 30 is spaced some finite distance therefrom.

A means 32 for generating a voltage gradient is coupled to inversion plate 26 for applying a voltage across the inversion plate. Typically, the voltage gradient means 32 may take the form of a battery with its negative terminal attached to the lead 32 connected to the left end 28 of inversion plate 26. The positive terminal of voltage gradient means 32 is connected to lead 34 at end 30 of inversion plate 26. The voltage gradient means 32 causes a current to flow through inversion plate 26, resulting in a linear voltage gradient existing along the length of the plate. The polarity and the value of the voltage supplied by voltage means is such that the semiconductor region of wafer 10 immediately adjacent region 12 is at or very close to the inversion potential of the region. The other points beneath the inversion plate and lying along its length further removed from region 12 are at a potential increasingly less than the inversion potential.

A voltage means 40 is connected to lead 34 for progressively applying an inversion potential to points beneath the inversion plate. This creates an expanding region within wafer 10 having a conductivity type opposite to the wafer. The voltage means 40 may take the form of a voltage ramp generator which supplies an output increasing linearly and negatively with time. It is possible to reverse the polarity of the voltage generated by means 40, the conductivity type of the impurities employed in wafer 10 and region 12, and the terminal connections to voltage gradient means 32. The aplication of the negatively increasing voltage will result in a negatively increasing potential being applied to points on the semiconductor wafer 10 beneath inversion late 26. Thus, an inversion potential is first applied at end 28 of plate 26 and then moves from left to right until an inversion potential is applied to essentially the entire wafer 10 which lies beneath inversion plate 26.

It is well known in the metal oxide silicon transistor technology, as described in U.S. Patent 3,102,230 issued to Dawon Kahng on Aug. 27, 1963, that the surface of a given conductivity type semiconductor will invert to the opposite conductivity type semiconductor when an appropriate potential—i.e., the inversion potential—is applied to the semiconductor surface across an insulating material. In the case of an N-type semiconductor, this potential has a negative polarity attracting holes and repelling electrons. This creates a limited inversion region of opposite type conductivity within the bulk semiconductor and near its surface. The formation of this junction along with the capability to expand the inversion region and associated junction enables a scanning photosensitive diode detector to be formed. More broadly, the inversion region may be considered an expanding or contracting conductive layer with respect to region 12. The controlled expansion of inversion region may be employed to selectively connect two separated points with a conductive layer thereby functioning as an accessing device.

The above described device may be formed by well known semiconductor processes. For example, the region 12 and oxide 24 may be formed by photoengraving and diffusion techniques such as described in U.S. Patent 3,064,167 issued to J. A. Hoerni on Nov. 13, 1962. The forming of lead 14 and associated contact uses processes such as described in U.S. Patent 2,981,877 issued to R. N. Noyce on Apr. 25, 1961. The formation of the inversion plate 26 may be readily achieved by processes such as described in U.S. Patent 3,102,230 issued to Dawon Kahng on Aug. 27, 1963.

With the detailed construction of the device in mind, its operation will now be considered. In a typical operating environment, the surface of wafer 10 is placed in the plane in which light distribution is to be sensed. With the light incident the surface of wafer 10, voltage means 40 will apply a ramp voltage across the inversion plate 26. The ramp voltage supplements the voltage applied by voltage source 32, and results in an inversion potential being first applied to the portion of the semiconductor wafer 10 adjacent region 12 and then progressing along the surface of the wafer beneath plate 26. The inversion potential causes a P-type inversion region to begin adjacent region 12 and expand from the left to the right. The expanding P-type region forms a PN junction with wafer 10. With the light incident this junction and the junction reverse biased by biasing means 16, the PN junction will act as a photodiode and supply a current to differentiator means 23 which is proportional to the incident light. The differentiator 23 will differentiate the current which consists of a linearly increasing component of leakage or dark current plus the integral of light current resulting from illumination falling on the inversion plate area. Thus, in differentiating this current, a signal is recovered corresponding to the spatial distribution of illumination along the inversion plate.

From the above detailed description, it can be seen that an improved and novel scanning or accessing means has been invented. The device is simple in construction requiring only four leads, and eliminating all the complexities and costs incident to such devices as diode arrays and camera tubes. While there has been disclosed the novel features of the invention as applied to one embodiment, it will be apparent that various omissions and substitutions and changes in the form and details of the device and its operation may be made by those skilled in the art without departing from the spirit of the invention. It is the intention therefore to be limited only as indicated by the scope of the appended claims and the reasonable equivalence thereof.

What is claimed is:

1. A scanning device comprising:
a wafer of monocrystalline semiconductor material having a first conductivity type;
a region within said wafer having a conductivity type opposite to said wafer with a PN junction therebetween for defining a contact;
a layer of insulating material capable of transmitting light therethrough overlying a substantial portion of said wafer;
a conductivity inverting inversion plate of resistor material formed to permit light to pass therethrough and located in the proximity of said region in overlying relationship with a portion of said insulating material;
a voltage gradient means coupled to said inversion plate but not to said PN junction for applying a voltage across said inversion plate; and
voltage means coupled to said inversion plate for progressively applying an inversion potential to points beneath said inversion plate to create within said wafer a region having a conductivity type opposite to said wafer whereby a PN junction having a controllable length is created.

2. A scanning device comprising:
a wafer of monocrystalline semiconductor material having a first conductivity type;
a region within said wafer having a conductivity type opposite to said wafer with a PN junction therebetween for defining a contact;
a layer of transparent insulating material overlying a substantial portion of said wafer;
an elongated conductivity inverting inversion plate of resistor material that is at least semitransparent located in the proximity of said region in overlying relationship to said insulating material;
a voltage gradient means coupled to said inversion plate but not to said PN junction for applying a voltage across said inversion plate that places the point of said wafer in closest proximity to said region at its inversion potential; and
voltage means coupled to said inversion plate for progressively applying an inversion potential to points beneath said inversion plate within said wafer to create an expanding region having a conductivity type opposite to said wafer, whereby a PN junction having a controllable length is created.

3. A solid state scanning device, comprising:
a wafer of monocrystalline silicon having a first conductivity type;
a region within said wafer having a conductivity type opposite to said wafer with a PN junction therebetween for defining a contact;
a layer of silicon dioxide overlying a substantial portion of said wafer;
a conductivity inverting inversion plate of resistor material formed to pass light therethrough and located in the proximity of said region and overlying at least a portion of said silicon dioxide;

a voltage gradient means coupled to said inversion plate but not to said PN junction for applying a voltage across said inversion plate and for placing the region of said wafer adjacent said region at an inversion potential and the other points beneath said inversion plate at a potential less than said inversion potential; and voltage means coupled to said inversion plate for progressively applying an inversion potential to the points beneath said inversion plate than are normally at a potential less than the inversion potential to create an expanding region having a conductivity type opposite to said wafer, whereby an expanding inversion region is created.

4. A solid state scanning device, comprising:

a wafer of monocrystalline silicon having a first conductivity type;

a region within said wafer having a conductivity type opposite to said wafer with a PN junction therebetween for defining a contact;

a layer of silicon dioxide overlying a substantial portion of said wafer;

a conductivity inverting inversion plate of resistor material formed to pass light therethrough and located in the proximity of said region and overlying at least a portion of said silicon dioxide;

a voltage gradient means coupled to said inversion plate but not to said PN junction for applying a linear voltage gradient across said plate with the region of said wafer adjacent said region at an inversion potential and the other points beneath said inversion plate at a potential less than said inversion potential; and voltage means coupled to said inversion plate for applying a linearity increasing voltage to said inversion plate so that an inversion potential is progressively applied to the points beneath said inversion plate that are normally at a potential less than the inversion potential to create an expanding region having a conductivity type opposite to said wafer, whereby an expanding inversion region is created.

5. A scanning device comprising:

a wafer of monocrystalline semiconductor material having a first conductivity type;

a region within said wafer having a conductivity type opposite to said wafer with a PN junction therebetween for defining a contact;

a layer of insulating material capable of transmitting light therethrough overlying a substantial portion of said wafer;

a conductivity inverting inversion plate of resistor material formed to permit light to pass therethrough and located in the proximity of said region in overlying relationship to said insulating material;

means coupled to said inversion plate but not to said PN junction for applying a voltage to said inversion plate having a form and magnitude that creates an opposite conductivity type region within said wafer which increases and decreases in length in a controlled manner, said opposite conductivity type region forming a PN junction; and means for reverse biasing said PN junction, whereby a photo-scanning diode having a controllable length is created.

6. A scanning device comprising:

a wafer of monocrystalline semiconductor material having a first conductivity type;

a region within said wafer having a conductivity type opposite to said wafer with a PN junction therebetween for defining a contact;

a layer of insulating material capable of transmitting light therethrough overlying a substantial portion of said wafer;

a conductivity inverting inversion plate of resistor material formed to permit light to pass therethrough and located in the proximity of said region in overlying relationship to said insulating material; and means coupled to said inversion plate but not to said PN junction for applying a voltage to said inversion plate having a form and magnitude that creates an opposite conductivity type region within said wafer which increases and decreases in length in a controlled manner, said opposite conductivity forming a PN junction, whereby a PN junction having a controllable length is formed.

7. A solid state scanning means, comprising:

a monocrystalline semiconductor material having a first conductivity type;

conductivity inverting inversion plate means responsive to incident light falling upon it coupled to the surface of said semiconductor material and means connected to said plate for reversibly and periodically forming a region of opposite conductivity type therein having a variable and controlled length, whereby a PN junction having a controllable length is created within said semiconductor material below said surface.

References Cited

UNITED STATES PATENTS

| | | | |
|---|---|---|---|
| 3,028,500 | 4/1962 | Wallmark | 210—211 |
| 3,056,888 | 10/1962 | Atalla | 307—88.5 |
| 3,102,230 | 8/1963 | Kahng | 307—88.5 X |
| 3,204,159 | 8/1965 | Bramley et al. | 317—235 |
| 3,211,911 | 10/1965 | Ruhge | 250—211 X |
| 3,317,733 | 5/1967 | Horton et al. | 250—211 |

OTHER REFERENCES

Morrison: Solid-State Electronics; Pergamon Press; 1963; vol. 5; pp. 485–494 (printed in Great Britain).

WALTER STOLWEIN, *Primary Examiner.*